Patented Jan. 24, 1950

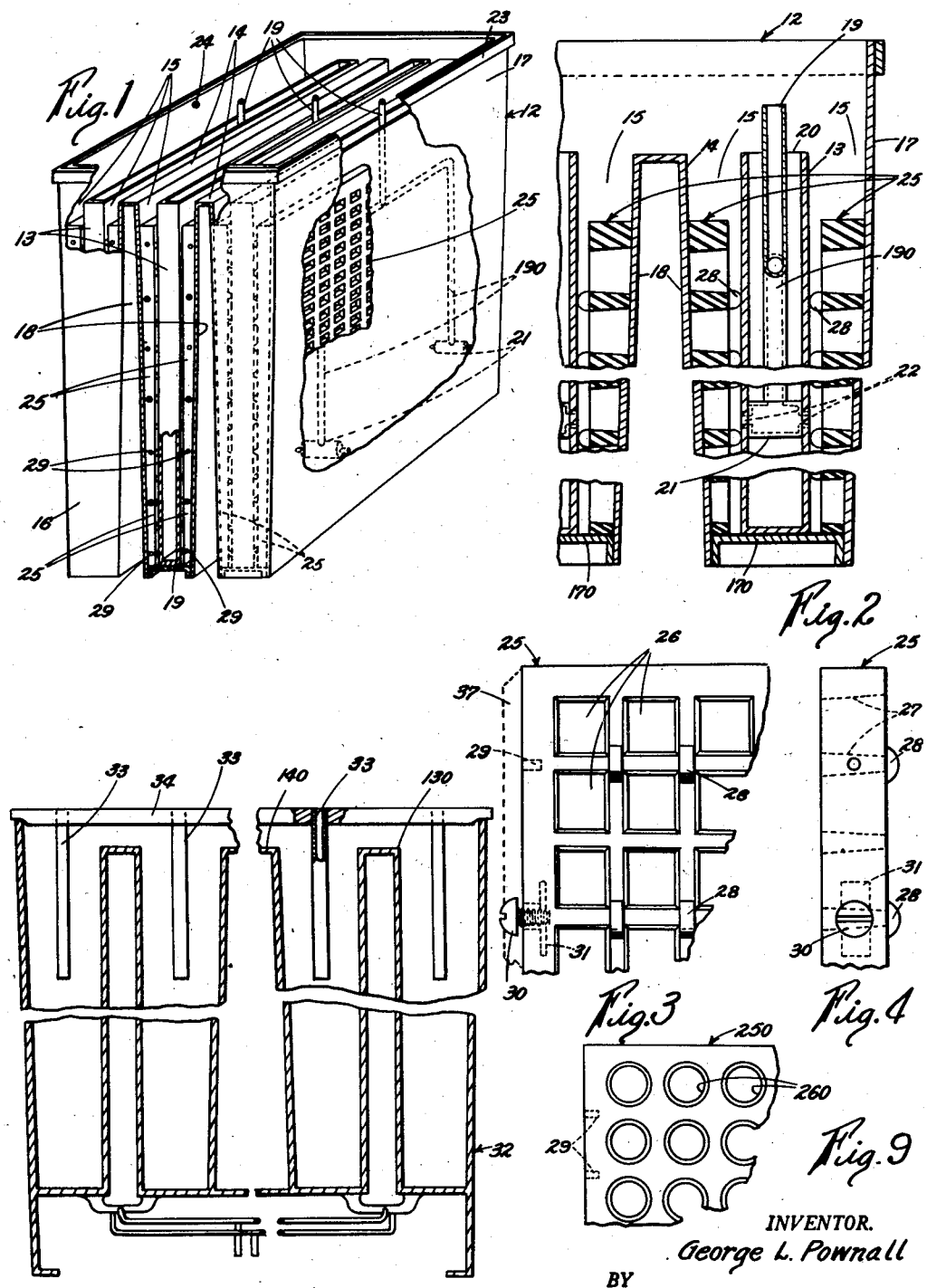

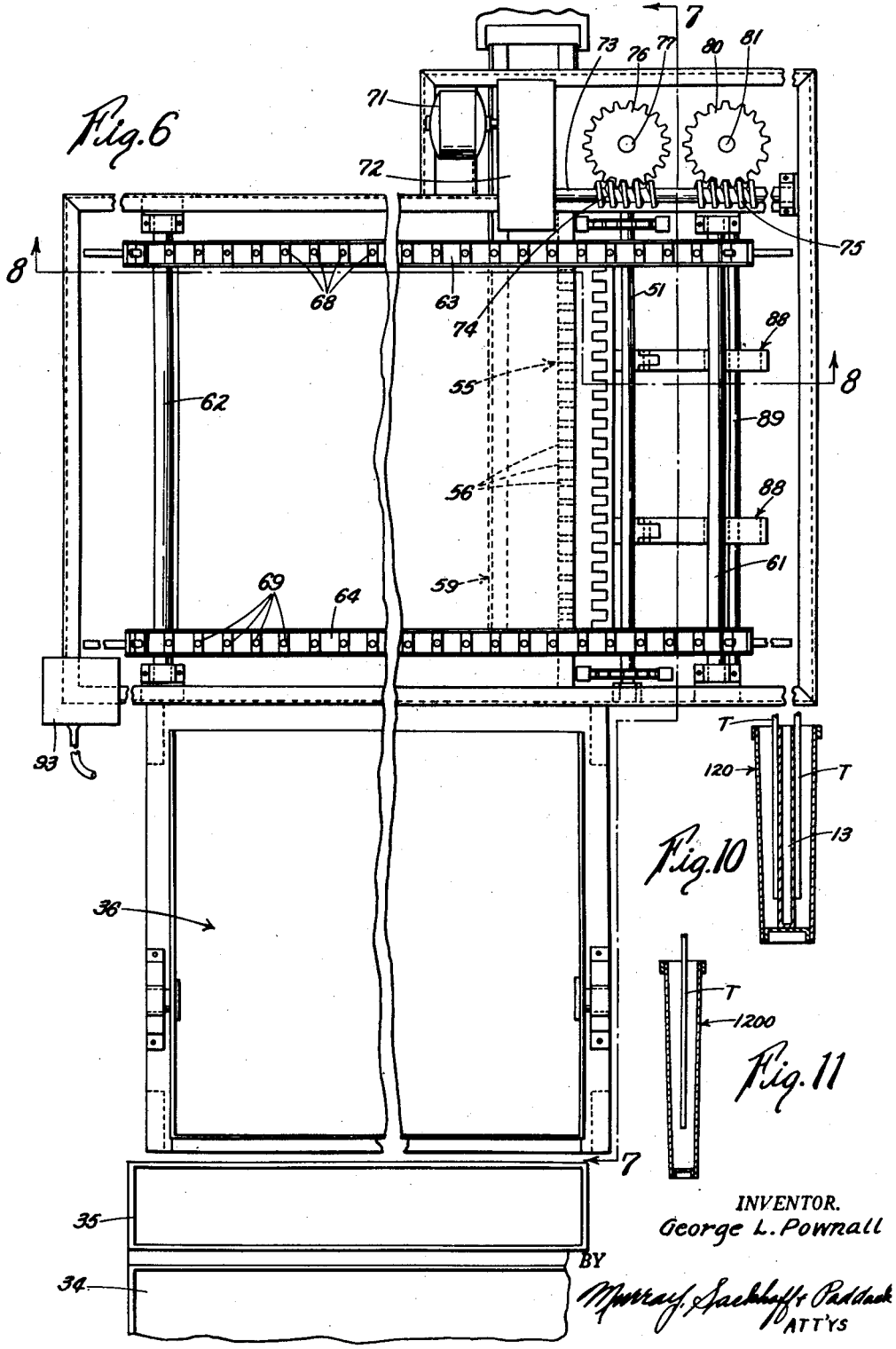

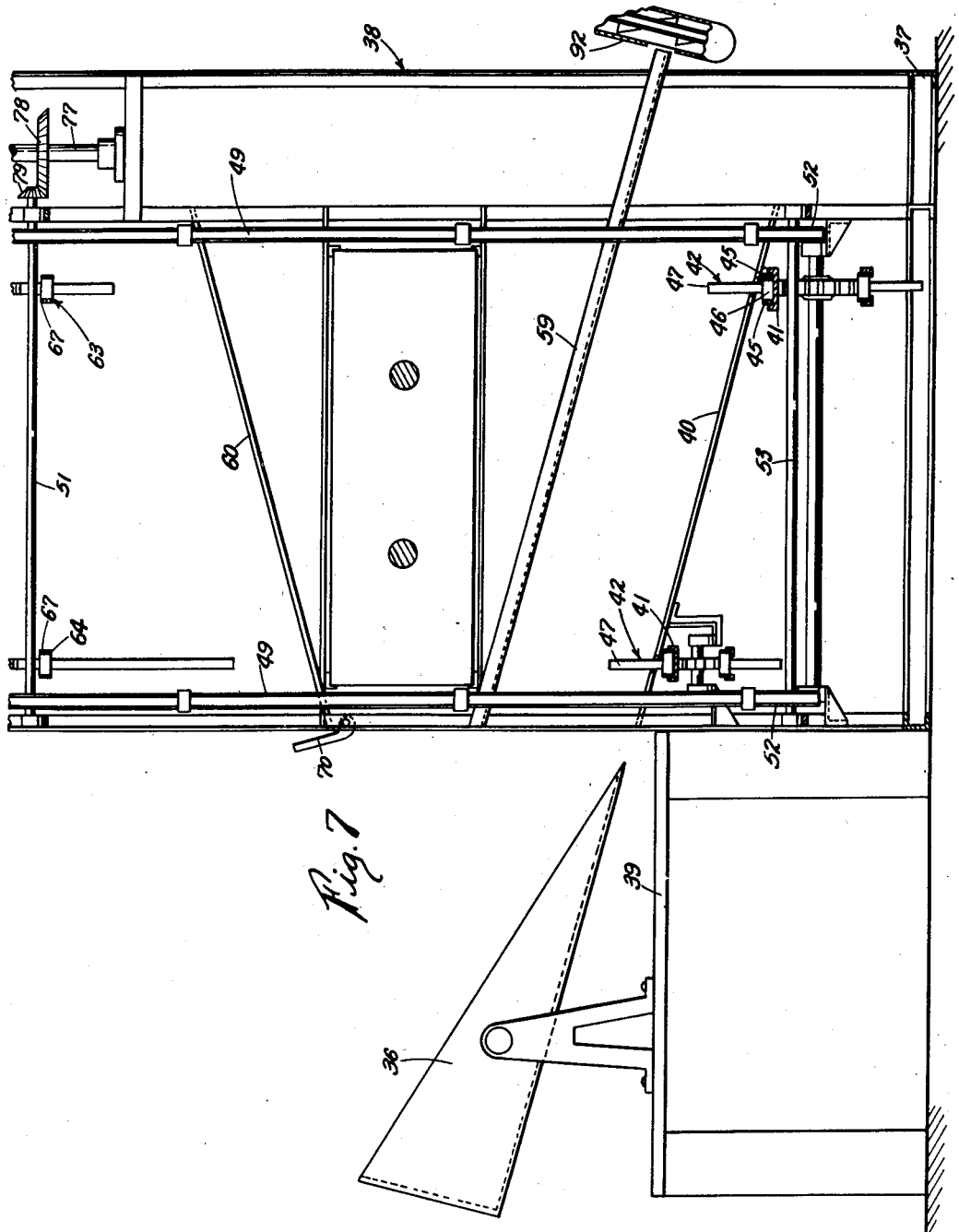

2,495,421

UNITED STATES PATENT OFFICE 2,495,421

APPARATUS FOR BULK PRODUCTION OF SMALL ICE

George L. Pownall, Junction City, Ohio

Application November 3, 1943, Serial No. 508,827

16 Claims. (Cl. 62—157)

1

The present invention relates to commercial ice production, and has for its general object the provision of means and methods of increasing the production of small ice in commercial ice plants in an economical manner and with the use of much of the existing plant facilities.

A further object of the invention is to provide means and methods whereby large scale production of small molded shapes such as ice cubes or cylinders for the drinking glass may be carried on with improved ice cans using suitable molds that are adapted to rapid and automatic methods of harvesting.

A still further object of the invention is to provide an improved vertical mold which is adapted, upon freezing in its can compartment, to receive a thin edge protecting strip of ice upon which the mold may slide on dumping the cans in the can dump.

A still further object of the invention is to provide means for rapidly producing clear, transparent and coreless thin slabs of ice.

Another object of the invention is to provide a system of small ice production including automatic means of harvesting molded ice shapes from the filled molds and also for producing crushed ice having a low percentage of snow ice therein.

These and other important objects are attained by the means and method described herein and exemplified in the accompanying drawings, in which:

Fig. 1 is a perspective view showing an ice can and molds of the invention, parts being broken away.

Fig. 2 is an enlarged fragmental cross sectional view of the device of Fig. 1.

Fig. 3 is an enlarged fragmental front elevational view of a mold forming part of the invention.

Fig. 4 is a fragmental end elevational view of the mold shown in Fig. 3.

Fig. 5 is an enlarged cross sectional view of a stationary type of ice can unit embodying the invention.

Fig. 6 is a top plan view showing an automatic harvesting mechanism for the molds of Fig. 3, operatviely associated with a conventional can dump, dip tank and freezing tank, parts being broken away.

Fig. 7 is a cross sectional view taken on line 7—7 of Fig. 6.

Fig. 9 is a fragmental front elevational view

Figure 8:
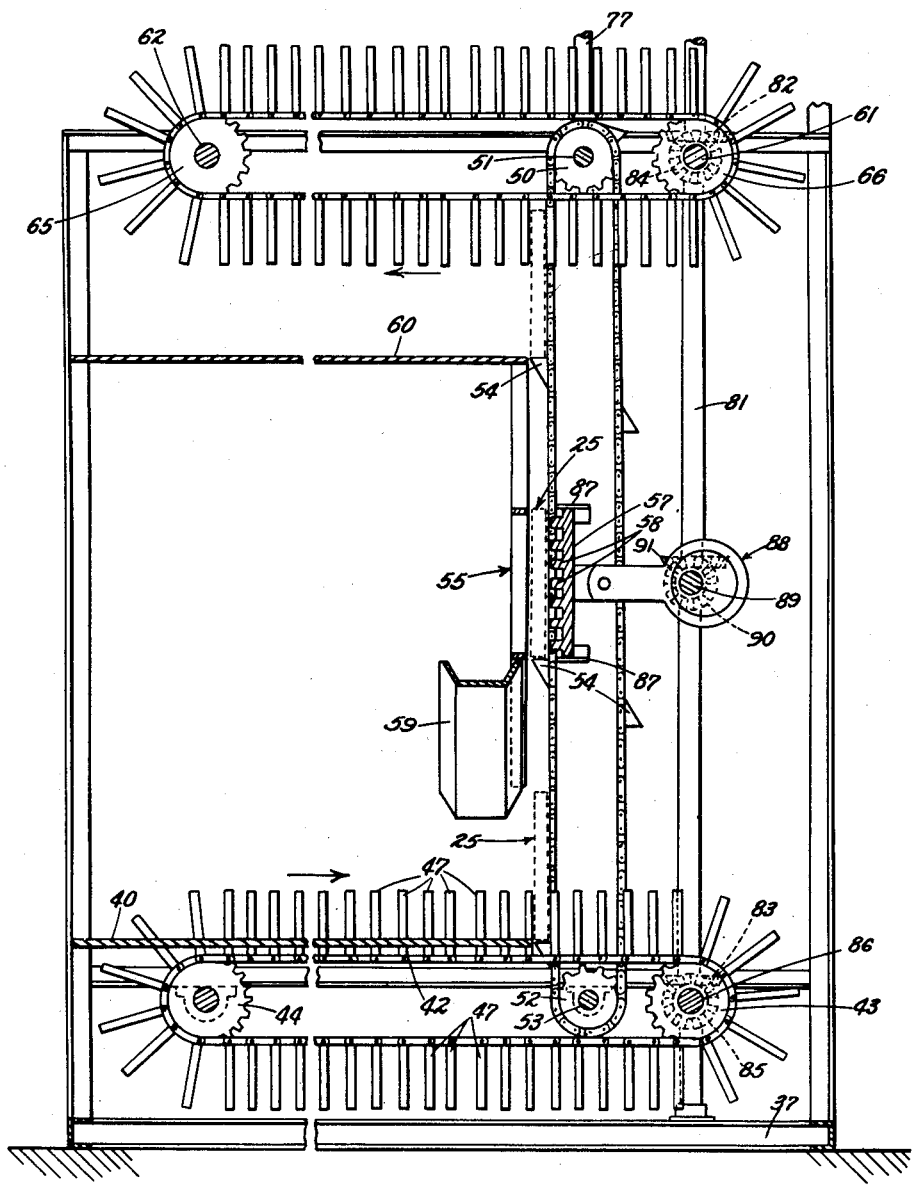
Fig. 8 is a cross sectional view taken on line 8—8 of Fig. 6.

2 of a modified form of mold for producing molded ice cylinders.

Fig. 10 is a vertical cross-sectional view showing another form of freezing can of the invention.

Fig. 11 is a vertical cross-sectional view showing still another freezing can.

The production of small ice in commercial ice plants by the present day methods includes the freezing of the large and well known blocks of ice and reducing them to table ice cubes by sawing, or to graded or sized ice by crushing and screening. In each instance freezing of the large blocks is a time consuming operation and the reduction of these blocks to the desired cubes or to sized ice produces an excessive proportion of fine ice or "snow ice" which is less profitable when sold and which often finds no market.

The production of small ice thus involves freezing, harvesting and processing, each of which add to the cost of the final product. In my prior Patents Nos. 1,995,686, 1,996,049 and 1,996,050 of March 26, 1935, are disclosed methods and means to produce table ice portions in such quantities as could be profitable if the hand method of harvesting could be taken care of in the spare time of a normal group of employees in the plant. However, the increased demands for ice cubes and sized ice through commercial channels affords a field for improved means and methods whereby the output capacity of an existing ice plant can be further increased.

To this end, I have provided improved means and methods of small ice production which include the freezing of ice in such form that it can be handled by existing plant facilities to the point of processing and then quickly and automatically handled to completion. The method and means of the invention will be understood to be useful for both clear and opaque ice in the form of table ice cubes or pieces of molded shape as well as crushed ice, sized ice and if desired large thin slabs of ice.

In the preferred form the ice can of the invention is constructed as a can unit which occupies one can space in the freezing tank of an ice plant (see Fig. 1), and has, moreover, the same overall dimensions and the same provisions for engagement by the can hoist apparatus as the well known removable ice cans.

The can unit 12 is divided by double walled partitions 13 and 14 arranged alternately in spaced relation across the breadth of the can and for the greater portion of the length thereof, so that the thickness of the can unit is divided interiorly into a plurality of thin vertical compartments 15. The partitions 13 are open to the atmosphere at one end only, which in the case of a removable can unit is the top end. Hence, when the can unit is in the freezing brine tank the brine is excluded from contact with one wall of each compartment. The partitions 14 are open on the sides where they join the narrow side walls 16 of the can unit, said side walls 16 being slotted or cut away to afford an open brine flow channel inside said hollow partitions 14. The major outside walls 17 of the can unit each form a freezing wall for the outermost compartments respectively, while the several walls 18 of each partition 14 form the freezing walls for the respective inner compartments. Bottom wall members 170 close the lower ends of the pairs of compartments 15 on opposite sides of each of the hollow partitions 13.

At this point it may be noted that the above described can, as well as those hereinafter mentioned, are all formed with a slight taper to the cans or the compartments thereof, to permit the ice to be removed without difficulty.

As shown in Fig. 10 a can unit may be used in suitable numbers with the spacing between the cans 120 in the row serving in lieu of the hollow partitions 14 of Figs. 1 and 2. The can 120 has one hollow partition 13 which is identical with the partition 13 of Figs. 1 and 2. The air tubes T may be secured to the walls of partition 13 inside the compartment that receives the molds, instead of being located inside the hollow partition.

As shown in Fig. 11, a single thin can 1200 may be employed with an air tube T merely suspended therein when transparent ice is wanted.

Any of the freezing cans 12, 120, or 1200 may be handled in groups by using the grid system of can handling whenever such system is available. The present day grid systems handle either a few cans or a whole row of cans in the ice freezing tank as if it were a single unit when harvesting the ice.

For the purpose of freezing clear ice in the compartments 15, an air-header tube 19 extends downwardly through the open top 20 of each partition 13, and then branches laterally and downwardly to provide a plurality of branch tubes 190 which connect with hollow cross heads 21, which are secured at opposite ends to adjacent the inner faces of the walls of partitions 13. Perforations 22 provide communication between the interior of each cross head 21 and the compartments 15 at its opposite ends. The unit 12 is reenforced at its top by a can band 23 of conventional design, and is provided with the usual holes 24 for receiving the hooks of a conventional can hoist mechanism (not shown).

From the foregoing, it will be apparent that when the can units 12 are filled with water and placed in an existing commercial freezing tank, the freezing will progress from the outer surfaces of the major side walls 17 and from the walls 18 of partitions 14 inwardly toward the adjacent faces of the hollow partitions 13. The partitions 13, being in open communication with the atmosphere, and out of contact with the brine, will remain relatively warm and will form the last surface against which the contents of the compartments will freeze. When the tubes 19 are connected with an existing source of pressure air in the ice plant, air will bubble through the water in each compartment, entering near the bottom of the non-freezing walls of hollow partition 13. In this way, clear ice is produced in independent bodies in the respective compartments.

For freezing ice cubes, or molded ice portions, for the drinking glass in the unit just described, a mold, indicated generally at 25 is introduced into each of the compartments 15. The mold 25 is a slab of material, preferably rubber, and is provided with apertures 26, extending entirely through the thickness of the slab, with the side walls 27 of the apertures tapering slightly and in an uniform direction. On one face of each mold are protuberances 28 which are adapted to contact the non-freezing wall of hollow partition 13 and thus slightly space one face of the mold away from said wall to permit the bubbling of said air along the inner face of said non-freezing wall for the purpose of producing clear, transparent ice cubes or table ice portions. At this point, it should be observed that the taper of the walls of apertures 27 in all of the said mold slabs will necessarily have to be in a common direction in order to accommodate them to the automatic harvesting means hereinafter described. In order to do this, and at the same time to space adjacent molds from the adjacent walls of partitions 13, the alternate molds in use will have the protuberances 28 on relatively opposite faces.

Along the vertical edges of molds 25 are formed shallow cavities 29 disposed at intervals. Intermediate cavities 29, the same vertical edges of the molds are provided with shallow protruding anti-friction bosses 30 which may be comprised of button-headed screws threaded into tapped metal plate 31, which are molded into the slab. The bosses 30 are in this way made readily renewable with little effort or expense, and they serve not only to space the edges of the mold slabs from the vertical edges of the compartments, but they also support the ice filled molds during their sliding movement in the can dump and in the harvesting mechanism hereinafter described.

The mold 250 (see Fig. 9) has tapered cylindrical apertures 260 for molding the ice into cylindrical rolls instead of cubes. The slab of the mold 250 may have edge cavities 29 like the mold 25 of Fig. 3 to anchor a protective sheet or strip of ice thereto. The slab mold 250 may be loosely disposed in a compartment of any of the aforementioned can units.

Reference is now made to Fig. 5 of the drawings wherein the invention is shown embodied in a stationary type ice can indicated generally at 32. In such a can, the fundamental distinction over the removable type can 12 is found in having the non-freezing hollow partition 130 opening at the bottom end of the can instead of at the top end of the can, so that a spray of warm water may be introduced into the interior of said partition 130 to release the ice bond on the walls of said partition. The hollow partition 140 may be closed at both top and bottom ends, but is open at the side edges so that it may serve as a brine flow channel. Ice slabs or molds frozen in can 32 may be removed through the agency hollow tubes 33 which depend into and are frozen in the ice slabs, the tubes being mounted in or connected to a cross member, which rests on top of the can unit during the freezing operation, and which is picked up by a hook in order to lift the entire group of ice slabs from the several compartments at one time.

Reference is now made to Figs. 6, 7 and 8, wherein the automatic harvesting method and apparatus of the invention are illustrated. 34 represents the freezing tank of an existing ice plant and immediately along the edge thereof is a dip tank of conventional construction. Immediately adjacent dip tank 35 is the ice can dump 36 (shown conventionally). The can hoist apparatus is not illustrated, but it may be of any approved type and will serve to remove one or more of the can units 12 from the tank 34 and then lower them into the dip tank or warm water bath 35, wherein the warm water contacts all of the can walls and partition walls, and fills the hollow interior of the partitions 13. By this operation, the ice bond is broken on all sides of each compartment. The ice, however, remains attached to the mold, and a thin protective strip of ice 37 remains anchored to the outside vertical edges of each mold. This ice strip is of a thickness equal to the bosses 30. The unit or units 12 are then raised by the hoist and placed in the can dump 36, when the latter is in an upright position. Dump 36 is then tilted to the position shown in Fig. 7, whereupon the contents of the several can units 12 slide out of the inclined cans and travel on the ice strips 37 and bosses 30 in an end-wise direction into the automatic harvesting machine.

At this point it will be understood that can units 120 or 1200, if used, will be handled preferably by an existing grid type can handling system up to the point of placing them in the can dump.

As can be best seen in Fig. 7, the base 37 of the harvesting mechanism 38 is set sufficiently below the level of floor 39, which supports the can dump 36 to bring a lower inclined shelf 40 of the mechanism in the plane of the tilted can dump.

On either side of the shelf 40 and riding in channel tracks 41 is a conveyor chain 42 carried by sprockets 43 and 44. The chains 42 are made of side bar links 45, connected by cross blocks 46, each having an arm 47 extending rigidly therefrom. The arms 47 provide spaces between which the ice-filled mold slabs 25 pass as they slide out of the can units 12 onto the shelf 40. Assuming that a row of twenty of the can units be simultaneously tilted by the can dump 36, then one hundred twenty of the molds 25 will slide out of the can units and onto the shelf 40 between the arms 47 which hold said molds in an upright position in parallel relation. Chains 42 are arranged for intermittent movement in unison in the direction of the arrow (Fig. 8) so that the ice filled molds 25 are successively brought to an upright elevator conveyor 48, comprised of a pair of endless conveyor chains 49 supported on sprockets 52 on a lower shaft 53. The elevator conveyor chains 49 are equipped with brackets or lugs 54 which serve to lift the successive molds 25 from the shelf 40 and raise them to a horizontal position alongside a horizontally disposed grid 55 made up of flat bars 56 which are spaced apart at distances slightly greater than the wide end of the apertures 26 in the mold. The grid 55 may have one or more intermediate horizontal members (not shown) transversing the vertical bars 56 to assure proper functioning of the grid and its associated press plate on an inserted slab or mold. A press plate 57, having projections 58 corresponding to the apertures 26 of the mold 25, is arranged for reciprocation toward the mold so that said projections engage the smaller ends of the ice in said apertures and push the molded ice cubes out of the mold apertures and through the grid from whence the cubes drop into rearwardly inclined cube chute 59. The elevator conveyor has intermittent motion alternately with the intermittent motion of conveyor chains 42, and the press plate moves toward the grid 55 during the interval when the elevator is at rest, and at the same time that conveyor chains are moving the molds along shelf 40 to position another mold against the elevator.

Above the grid 55 and substantially coextensive with lower shelf 40 is an upper shelf 60 which is inclined toward the front of the harvesting mechanism. Above the shelf are mounted horizontal shafts 61 and 62 carrying the upper conveyor chains 63 and 64 on pairs of sprockets 65—65 and 66—66 respectively. Said chains are suitably guided, as by channel tracks 67. The arms 68 on chain 63 are shorter than the corresponding arms 69 on chain 64, so that the ends of the downwardly extending arms on both chains may receive the successive empty molds 25 from the elevator and slide them along the shelf 60 in the direction of the arrow in Fig. 8. A pivoted plate 70 extends along the front edge of shelf 60 and is normally positioned (as shown in Fig. 7) in an upwardly turned relation in order to prevent the molds 25 from sliding off of shelf 60 until it is desired to release them.

The upper conveyor chains are driven intermittently and in synchronism with the lower conveyor chains. The power drive for the entire mechanism as here shown comprises a motor 71 with a speed reduction device 72 which turns a worm shaft 73 which carries worms 74 and 75. The worm 74 meshes with worm gear 76 carried by a short vertical shaft 77 which has a bevel gear 78 meshing with bevel pinion 79 on the end of shaft 51. The intermittent motion of shaft 51 is attained by the omission of certain of the teeth in gear 77.

The upper and lower conveyor chains and the press plate are driven from worm 75 which meshes with worm gear 80 carried by vertical shaft 81. Shaft 81 extends to the base 37 of the entire mechanism and has upper and lower bevel gears 82 and 83 respectively which gears have corresponding teeth omitted so that synchronous intermittent motion may be imparted to bevel pinions 84 and 85 respectively. Shaft 61 carries the bevel pinion 84 and drives the upper conveyor chains.

Shaft 86 carries pinion 85 and carries the sprocket 43, which drives the lower rear conveyor chain 42. By suitable gearing (not shown) the forward lower conveyor chain receives its drive from shaft 86, this arrangement being used solely to conserve space at the bottom of the device.

The reciprocating movement of press plate 57 in its fixed guides 87 is derived by means of eccentric cams 88—88 on shaft 89 which carries a bevel pinion 90 meshing with bevel gear 91 on shaft 81.

In producing its cubes by the means and method of the invention the units 12 with the mold 25 in the compartments as shown in Figs. 1 and 2 are charged with water to a proper level near the top of the molds and are then disposed in rows in the can spaces of freezing tank 34. This is done in the manner of can handling provided for in the plant. The air tubes 19 are connected to the plant air lines for agitating the water content of each compartment if clear transparent ice is desired. With the compartments approximately one and one-quarter inches wide at the top, and with the brine at 14° F. in the tank, the freezing time requires two hours and ten minutes. Thereupon a row of can units 12 are pulled from the freezing tank, then lowered into the warm water bath 35 where the open topped hollow partitions are filled with water. This row of can units is now pulled from the bath 35 and placed on the can dump 36 while the latter is in upright position. The dump is tilted forthwith and the ice filled molds slide onto lower inclined shelf 40 in an edgewise position between the several arms 47 on the front and rear conveyor chains 42 while the mechanism is at rest. The motor 71 is then started and the entire group of molds from the row of can units moves automatically and successively to the elevator which raises each mold to a position at rest before the press plate station where the cubes are dislodged and fall into the inclined cube chute 59 which discharges into a conventional bucket-type elevator 92 which carries them to storage. Meanwhile the mold is raised to the level of top shelf 60 and enters arms 68 and 69 of the upper conveyor which causes the molds to slide along on the anti-friction lugs 30 so long as the pivoted stop plate is tilted up in the position shown in Fig. 7. The speed of the mechanism is desirably arranged so that a full load of about 120 slabs on the lower shelf will be moved to the elevator, emptied by the action of the press plate and transported to the upper shelf during about 10 minutes.

While the molds are thus being automatically emptied and returned to approximately a corresponding position on the upper shelf, the operator returns the can dump to an upright position and charges the previously emptied cans (at least partially) with water from the filling tanks, such as 93 (see Fig. 6). The operator is also required to remove the first empty mold which comes to the upper shelf and return it to the compartment of the can from which it came. The remainder of the molds will be automatically racked on the upper shelf in reversed order, but will register with the compartments of the can units in proper relation so that the protuberances 28 of each mold will face the open-topped hollow partition of the compartment and the uniform direction of taper in the apertures of all of the molds will be preserved throughout the row of cans. The pivoted stop plate 70 may be lowered after adjusting the can dump 36 to the angle of incline of upper shelf 60, whereupon the molds 25 will all slide into proper positions in the compartments of all of the can units. The row of can units is returned to the freezing tank for the next freezing operation and another row of units is taken from the freezing tank for automatic harvesting. The output rate of finished cubes per can space by the present method and means greatly exceeds that of all previously known methods of making ice cubes, and in addition the present method is more economical of labor, plant space, power and metal for the replacement of cans. There is thus effected an unusual reduction in the costs of production.

When crushed ice is to be produced, the can units 12, 120 or 1200 are used without the molds 25 so that a plurality of thin slabs of ice are formed. The ice is clear, transparent ice if the air tube 19 is connected with the air supply line in the plant. The freezing time is approximately as previously required in freezing the water filled molds. Thereafter the units are pulled from the freezing tank, then immersed in the warm water tank and placed in the can dump. The can units are tilted by the dump, whereupon the thin slabs of ice are slid into the spaces between arms 42 of the lower conveyor which move said slabs successively to the elevator 48. When the thin slab is brought to rest alongside grid 55, the projections 58 on the press plate exert a crushing action on it. The crushed ice which results contains a much smaller proportion of fine ice or "snow ice" than is produced in crushing the well known large ice blocks. This is due largely to the fact that thinner pieces of ice are crushed or broken with a greatly reduced proportion of "snow ice" and a correspondingly larger proportion of the larger particles which are sorted by screening or "sizing" devices in known fashion and by apparatus (not shown) which is generally found in present day modern ice plants.

The system of the invention thus affords a very efficient means for producing ice cubes, cylinders or crushed ice for sizing. In producing either type of small ice there are several noteworthy economies, namely, in the freezing time, in the labor of handling, and in the very great reduction in the amount of "snow ice," compared to the output of the sawing large ice blocks into cubes by machine, or crushing such large ice blocks for grading into sized ice.

As previously indicated, the addition of the can units 12 or 120 or 1200 molds 25 and 250, and harvesting mechanism 38 in an existing commercial ice plant at once increases the output capacity of the plant and reduces production costs for cubes or other molded shapes, crushed ice, and sized ice.

What is claimed is:

1. As a new article of manufacture, an ice can having a plurality of double walled, hollow, heat conducting partition members in spaced parallelism, at least one of said hollow walled partitions opening entirely through a pair of opposed side walls of the can, and at least an adjacent one of said double walled hollow partitions being closed at the sides of the can and one horizontal end of said partition and open to the atmosphere at the opposite horizontal end of the partition.

2. As a new article of manufacture, a vertical ice can having spaced apart heat conducting hollow double walled partitions arranged in parallelism therein, whereby the interior of the can is divided into a plurality of uniform compartments, at least one of said double walled hollow partitions opening through the side walls of the can, and the next adjacent double walled hollow partitions on either side of the last mentioned partitions being closed at the sides and one end and open to the atmosphere at one end only of the can.

3. As a new article of manufacture, a vertical ice can having spaced apart heat conducting hollow double walled partitions arranged in parallelism therein, and extending between the minor sidewalls of the can from the bottom of the can upwardly to a level somewhat below the plane of the top edges of the can, whereby the interior of the can is divided into a plurality of uniform compartments, at least one of said double walled hollow partitions opening through the side walls of the can, and the next adjacent hollow double walled partitions on either side of the last mentioned partition being open at the top end only of the can.

4. A stationary type vertical ice can comprising a hollow double walled heat conducting partition providing spaced vertical compartments in the can, said can having a raised slotted bottom, said partition being open only at its bottom end and in communication with the atmosphere through the slot in the bottom of the can.

5. As a new article of manufacture, a vertical ice can having spaced vertical compartments extending from one minor outer wall of the can to the opposite minor wall thereof, an inverted U-shaped heat conducting member extending between and through said minor can walls and forming spaced sidewalls for the respective compartments and a brine flow space between them, coextensive in width with the major sidewalls of the can and extending from the bottom of the can nearly to the top thereof, and a fixed heat conducting hollow partition extending the full width and depth of said compartments whereby each compartment is divided into two wide thin compartments, the major sides of said hollow partition forming non-freezing sidewalls for the respective thin compartments, said partition having full cross-sectional area opening to the atmosphere at the top end only.

6. As a new article of manufacture an open topped stationary type vertical ice can unit for mounting in a freezing tank, and provided with a walled channel extending between its minor sidewalls, dividing the unit into transverse vertical compartments terminating below the top of the unit, and having a brine flow space between them, each of said compartments having a fixed heat conducting hollow partition centrally spaced therein and coextensive with the brine flow channel, thereby dividing each of said compartments into two thin wide compartments, the hollow partitions having full cross-sectional area openings through the bottoms of the compartments to the atmosphere and closed at the tops, the base of each of said wide thin compartments having a perforation therein to accommodate connections for water and air supply means.

7. Apparatus for producing table size ice portions in a tank containing a circulating liquid refrigerant comprising a vertical ice can unit having spaced vertical compartments with the open tops thereof below the top of the unit and having a refrigerant flow space between the compartments, a fixed heat conducting partition extending longitudinally and centrally across each side of said compartments and dividing it into two wide thin compartments, the hollow partition having its full interior cross-sectional opening to the atmosphere at one horizontal end only, and slab like transversely apertured mold members disposed in each of the thin compartments adjacent the hollow partition and supported in said thin compartments on their bottom edges.

8. Apparatus for producing table size ice portions comprising a vertical ice can, a hollow heat conducting partition fixed centrally in the can along the bottom and sidewalls and terminating slightly below the top of the can to form two wide, thin compartments therein and a horizontal full cross-sectional opening to the atmosphere between the said thin compartments at one end of the partition only, a transversely apertured slab-like mold member removably disposed in vertical edgewise relation on the bottom of each thin compartment, and means on each mold member for spacing one major face of the two adjacent upright edges of the mold member in predetermined relation to the corresponding walls of the thin compartment.

9. Apparatus for making small ice portions for table use comprising a freezing can for use in a circulating liquid refrigerant tank said can having hollow heat conducting partitions dividing the can interiorly into a plurality of parallel vertical thin wide compartments, alternate partitions being closed save on one horizontal end and constituting heat conducting non-freezing walls for adjacent sides of certain adjacent compartments, the remaining partitions constituting freezing walls for the compartments, the minor sidewalls of the can comprising freezing walls for the minor upright sides of the thin compartments, slab-like mold members removably disposed vertically edgewise on the bottom of the respective thin compartments and means on the vertical side edges of the mold member and on one major side thereof for spacing the mold member from the non-freezing wall and the minor sidewalls of the thin compartment.

10. Apparatus for making small ice portions for table use comprising a freezing can for use with a refrigerating system and a slab-like mold member removably disposed therein in predetermined spaced relation to the can walls on three upright sides, and having spaced shallow cavities in its minor sides whereby to anchor a protective film of ice along its two minor sides during freezing of the water filled, mold containing can.

11. Apparatus for making small ice portions for table use comprising a freezing can for use with a refrigerating system and a slab-like mold member removably supported therein in a vertical position on the bottom of the can, a hollow drop rod, closed on its bottom extending downwardly into the can and a cross arm resting on the top of the can and having the drop rod secured thereto and serving to remove a frozen ice mass and the mold from the can when the latter are released from the can by a thawing agent.

12. Apparatus for making small ice portions for table use comprising a freezing can having two major outer walls connected by two minor walls having spaced slots extending from a distance below the top to the bottom thereof, heat conducting members connecting corresponding edges of opposed slots in said minor can walls and forming a plurality of wide compartments in spaced apart side by side relation in the can, a hollow heat conducting partition fixed centrally lengthwise of each compartment whereby to divide it into two wide thin compartments and to provide a heat conducting non-freezing wall for each thin compartment, said partitions having a horizontal full cross-sectional opening affording communication between the hollow interior of the partition and the atmosphere, a slab-like mold member having transverse ice molding spaces therethrough and opening on the major faces of the mold, and having a series of shallow cavities along two side edges thereof, said molds removably entered vertically into the respective thin compartments and resting on the bottoms of said thin compartments, means on one major face of each mold for spacing said face from the non-freezing wall of a thin compartment, and means intermediate the cavities on the side edges of the mold for spacing said side edges of the mold from the minor sidewalls of the thin compartments.

13. A vertical all metal ice can for use in a liquid refrigerant comprising a pair of major upright outer walls, a pair of minor outer walls connecting said major walls, a hollow partition connecting at its edges with the opposed inner faces of said minor walls and defining within the can parallel, spaced apart thin vertical compartments for receiving water to be frozen from the outer walls inwardly, and an intermediate void open to the atmosphere throughout one horizontal end when the aforesaid walls are subjected to the liquid refrigerant.

14. An all metal vertical ice can comprising upright major sidewalls, upright minor sidewalls connecting the major sidewalls, said sidewalls adapted for external contact with a liquid refrigerant, and a hollow partition dividing the interior of the can into spaced apart, non-communicating thin compartments for the reception of water to be frozen, and an intermediate void space, said hollow partition having a horizontal opening at one end for communication with the atmosphere only whereby the respective sides of the hollow partition form a heat conducting, non-freezing wall for the several compartments while the remaining walls of the can in contact with the refrigerant serve as freezing walls.

15. A vertical all metal ice can for partial submergence in a liquid refrigerant comprising spaced apart hollow partitions forming alternate thin water compartments and intermediate voids, certain of the hollow partitions defining said voids having a full horizontal cross sectional opening at one end only open to atmosphere and forming individual non-freezing walls for adjacent sides of adjacent water compartments, the remaining hollow partitions being open at opposite upright narrow ends to admit liquid refrigerant to one major wall of each water compartment.

16. Ice freezing means comprising a tank containing a liquid refrigerant, a vertical ice can submerged in the refrigerant to within a short distance of its top, a hollow partition extending entirely across the interior of the can and providing a pair of separated water receiving compartments with a void between them, said hollow partitions having a full horizontal sectional opening at one end and being fully closed on all remaining faces whereby the refrigerant is excluded from and the atmosphere is admitted to contact with a single wall of each water receiving compartment during the freezing of water in the compartments in said can in said tank.

GEORGE L. POWNALL.

REFERENCES CITED

The following references are of record in the file of this patent:

UNITED STATES PATENTS

| Number | Name | Date |
|---|---|---|
| 695,907 | Buckingham | Mar. 25, 1902 |
| 954,467 | Rogers | Apr. 12, 1910 |
| 984,168 | Stein | Feb. 14, 1911 |
| 1,174,591 | Lewis | Mar. 7, 1916 |
| 1,386,315 | Cary | Aug 2, 1921 |
| 1,873,287 | Chilton | Aug. 23, 1923 |
| 1,995,686 | Pownall | Mar. 26, 1935 |
| 1,996,049 | Pownall | Mar. 26, 1935 |
| 1,996,050 | Pownall | Mar. 26, 1935 |
| 2,256,703 | Carney | Sept. 23, 1941 |